United States Patent
Leontaris et al.

(10) Patent No.: US 9,467,693 B2
(45) Date of Patent: Oct. 11, 2016

(54) MULTIPLE-PASS RATE CONTROL FOR VIDEO CODING APPLICATIONS

(75) Inventors: Athanasios Leontaris, Mountain View, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1100 days.

(21) Appl. No.: 13/520,883

(22) PCT Filed: Jan. 3, 2011

(86) PCT No.: PCT/US2011/020030
§ 371 (c)(1),
(2), (4) Date: Jul. 6, 2012

(87) PCT Pub. No.: WO2011/084916
PCT Pub. Date: Jul. 14, 2011

(65) Prior Publication Data
US 2013/0128963 A1    May 23, 2013

Related U.S. Application Data

(60) Provisional application No. 61/292,700, filed on Jan. 6, 2010.

(51) Int. Cl.
*H04N 7/26*      (2006.01)
*H04N 19/50*     (2014.01)
(Continued)

(52) U.S. Cl.
CPC ...... *H04N 19/00569* (2013.01); *H04N 19/114* (2014.11); *H04N 19/124* (2014.11); *H04N 19/132* (2014.11); *H04N 19/14* (2014.11); *H04N 19/147* (2014.11); *H04N 19/15* (2014.11); *H04N 19/172* (2014.11); *H04N 19/192* (2014.11);
(Continued)

(58) Field of Classification Search
CPC ............... H04N 19/00569; H04N 19/114; H04N 19/124; H04N 19/132; H04N 19/14; H04N 19/147; H04N 19/15; H04N 19/172; H04N 19/192; H04N 19/50; H04N 19/587; H04N 19/59; H04N 19/61; H04N 7/26047
USPC .......................................................... 375/240
See application file for complete search history.

(56) References Cited

U.S. PATENT DOCUMENTS 6,205,174 B1 *   3/2001   Fert ...................... H04N 19/149
                                                                                  348/700
2007/0116126 A1 *  5/2007   Haskell ................ H04N 19/196
                                                                                  375/240.21

(Continued)

FOREIGN PATENT DOCUMENTS

WO       2008/051517       5/2008

OTHER PUBLICATIONS

Merritt, L. et al., "X264: A High Performance H.264/AVC Encoder".
(Continued)

*Primary Examiner* — William C Vaughn, Jr.
*Assistant Examiner* — Naod Belai

(57) ABSTRACT

Methods and systems for coding applications are described, where multiple coding passes are performed for purposes of rate control. Prediction structures are generated and used by the multiple coding passes to update coding statistics generated prior to the coding passes. The updated coding statistics are used for a subsequent coding operation.

28 Claims, 2 Drawing Sheets

(51) Int. Cl.
*H04N 19/147* (2014.01)
*H04N 19/172* (2014.01)
*H04N 19/15* (2014.01)
*H04N 19/61* (2014.01)
*H04N 19/114* (2014.01)
*H04N 19/124* (2014.01)
*H04N 19/132* (2014.01)
*H04N 19/14* (2014.01)
*H04N 19/192* (2014.01)
*H04N 19/587* (2014.01)
*H04N 19/59* (2014.01)

(52) U.S. Cl.
CPC ............ *H04N 19/50* (2014.11); *H04N 19/587* (2014.11); *H04N 19/59* (2014.11); *H04N 19/61* (2014.11)

(56) References Cited

U.S. PATENT DOCUMENTS

| | | |
|---|---|---|
| 2009/0086816 A1 | 4/2009 | Leontaris |
| 2010/0027622 A1* | 2/2010 | Dane ............... H04N 19/172 375/240.12 |
| 2011/0150094 A1* | 6/2011 | Wang ............... H04N 19/172 375/240.16 |

OTHER PUBLICATIONS

Itu, "Advanced Video Coding for Generic Audiovisual Services" H.264, Oct. 2009.

Guillotel, P. et al., "Adaptive Encoders: The New Generation of MPEG-2 Encoders", SMPTE—Motion Imaging Journal, Society of Motion Picture and Television Engineers, White Plains, NY, US, vol. 109, No. 4, Apr. 1, 2000, pp. 287-294.

\* cited by examiner

MULTIPLE-PASS RATE CONTROL FOR VIDEO CODING APPLICATIONS

CROSS-REFERENCE TO RELATED APPLICATIONS

This application claims priority to U.S. Patent Provisional Application No. 61/292,700, filed 6 Jan. 2010, hereby incorporated by reference in its entirety.

FIELD

The present disclosure relates to video coding. More in particular, it relates to multiple-pass rate control systems and methods for video coding applications.

BACKGROUND

Rate control is a component that performs a critical function in a modern video encoder. It ensures that the generated compressed bit stream (a) achieves the bit rate target, (b) satisfies maximum average bit rate constraints, and (c) satisfies hypothetical reference decoder (buffering delay) constraints, among others. An optional, but highly desirable, objective is to optimize the video quality of the compressed video bitstream.

Satisfying constraint (a) ensures that the compressed video bitstream will fit the communication pipe or storage space. For example, a wireless network may only allow up to 768 kbps for video transmission. This is in contrast to, say, a Blu-Ray disc, which may allow up to 40 Mbps of video bandwidth for traditional 2D applications and 60 Mbps of bandwidth for 3D applications employing codecs based on the H.264/MPEG-4 AVC video coding standard [see reference 1, incorporated herein by reference in its entirety] and its extensions, i.e. the Multi-view Video Coding (MVC) extension of MPEG-4 AVC. In addition, for archival applications or applications where bandwidth can be extremely high (such as reading from a hard drive) one may only specify the total size of the final bitstream file.

Constraint (b) derives from limitations of playback devices, which can only store and decode a certain number of bits per second. It is possible that during the encoding process a situation may occur where the average bit rate for the entire compressed bitstream achieves the bit rate target, but the average bit rate exceeds it locally, for example for a duration of some seconds. Often this can happen because difficult to code areas usually require more bits to ensure consistent or better video quality. However, these bitstream "spikes", provided they are large enough, can create problems for resource-constrained decoders. Problems that may affect a decoder include either overflowing of internal buffers or the inability to decode the bitstream in time to display the frames in the correct order and with proper timing.

Last, constraint (c) is closely related to constraint (b) and can be thought of as a more rigorous set of requirements that a bitstream has to satisfy. In short, the compressed bitstream has to be coded such that if transmitted at the target bit rate it will never cause a decoder buffer overflow or underflow, and as a result, the decoded video will never stall or stop during playback.

Rate control is also tasked with ensuring the best possible video quality given the above bit rate and buffering constraints.

DESCRIPTION OF EXAMPLE EMBODIMENTS

Figure 1:
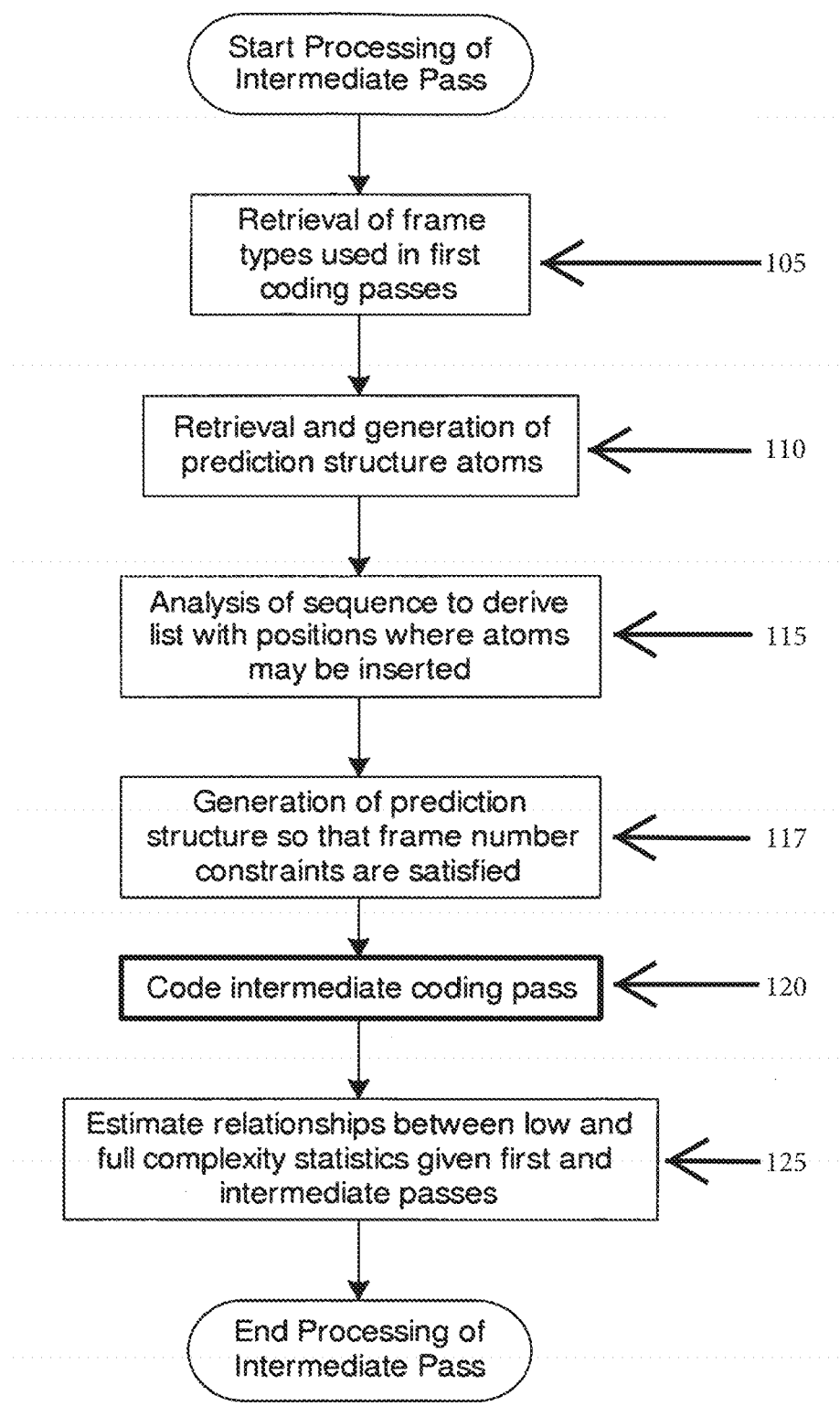
FIG. 1 shows a flowchart of an algorithm that prepares and performs one or more intermediate coding passes according to the disclosure.

Embodiments of the present disclosure are directed to techniques and methods for efficient low-complexity multiple-pass rate control.

According to a first embodiment, a method for coding video information in multiple coding passes to control rate of the video information is provided, comprising: providing initial statistics on video information; intermediate coding the video information one or more times through one or more asymmetric coding passes to provide updated statistics correcting for inaccuracies introduced by the initial statistics; analyzing the initial statistics and the updated statistics; and further coding the video information based on the updated statistics.

According to a second embodiment, a video information coding system is provided, comprising: one or more coders of a first type; a coder of a second type, adapted to code the video information at a complexity higher than the one or more coders of the first type; and a rate control analysis module, receiving statistical information on coded video information from the one or more coders of the first type and sending updated statistical information to the coder of the second type.

Further embodiments of the disclosure are provided in the specification, drawings and claims of the present application.

Throughout the present disclosure, reference will be made to "frames" and "pictures" in an interchangeable manner. A picture, as defined in the present disclosure, may comprise one or more frames, paired fields (interlaced coding), or unpaired top or bottom fields.

A video sequence may be coded in a single coding pass. A coding pass is defined herein as a series of one or more coding steps performed to an input, resulting in a compressed output. This may be due to computational or time constraints, or due to the nature of the content: the content is being streamed live and the fixed delay from capture to delivery to the consumer may only allow a small lookahead into the future. If these constraints are relaxed, one may wish to do more than one coding pass to compress the video sequence. In such a case, rate control benefits from information drawn from previous coding passes.

Information derived from previous coding passes, for example, may include a measure of the complexity, such as the number of header and texture bits generated for the given frame type and the quantization parameter (QP), the motion-compensated (inter) and intra prediction distortion on a local or frame level, or the temporal correlation of frames in the image sequence, among others, and can improve both bit rate accuracy and help satisfy the bit rate and buffering constraints. Header bits include bits used to code motion information, coding modes, block types, parameter sets, and also information that is not essential to the decoding process such as video usability descriptors. Texture bits include bits used to code the transformed coefficients of the inter or intra prediction residuals. Usually the latter number of bits forms the bulk of the coded bitstream especially for high bit rates.

Furthermore, information drawn from previous coding passes can greatly improve the quality of the compressed video bitstream. The reason is the availability of coding statistics for the entire video sequence. Such knowledge enables one to efficiently spend bits on the video sequence segments where they will do the most good (as usually measured in terms of maximizing rate-distortion performance or alternatively by spending more bits in areas with higher complexity). In general, the more coding passes, the better the video quality that can be achieved given some fixed bit rate budget. However, there will always be some point of diminishing return, where the return on coding gain will be trivial compared to the added computational expense. Hence, there is a need to constrain computational complexity during multiple-pass coding.

Multiple coding passes improve the video quality of the compressed video bitstream and help towards satisfying bit rate and buffering constraints (constraints (a), (b), and (c)). In accordance with embodiments of the present disclosure, asymmetric coding passes can be provided, both in terms of computational complexity, but also in terms of the set of the frames that will be coded. Furthermore, the objectives of each coding pass may vary. Objectives of the coding passes can include (a) establishing relationships (such as conversion ratio or ratio functions) of coding statistics for low vs. high computational complexity, (b) establishing relationship of coding parameters, such as quantization parameters (QP), for fixed computational complexity or, in other words, how coding parameters, such as the QP, affect quality and bit rate for fixed complexity, (c) establishing rate-distortion relationships for using different prediction structures, among others.

Asymmetric coding passes have been employed before to constrain computational complexity. In the open source x264 H.264/MPEG-4 AVC encoder [see reference 2, incorporated herein by reference in its entirety] there is a "fast" mode that constrains the number and complexity of the coding tools that are used for the first coding pass or coding passes. Doing so speeds up execution, often at the cost of a small coding loss. However, depending on the order of the speedup, the coding loss may be substantial and undesirable.

In the present disclosure, this coding loss is mitigated by designing coding passes that correct for estimation errors due to the low complexity coding passes that are used to speed up the multiple pass coding process. In particular, these intermediate coding passes unlike the first or final coding passes, adopt a coding/prediction structure that is not optimized for coding, transmission efficiency, or some kind of scalability or random access capability but rather for extracting a) information about the performance of coding tools for a particular content, b) the relationships of coding parameters with bit usage and resulting quality of the compressed video bitstream, and even c) information on the performance of different prediction/coding structures. The intermediate coding passes in accordance with the present disclosure are essentially an analysis tool and they can help account for inaccuracies introduced due to using fast first coding passes, among others.

According to embodiments of the present disclosure, the one or more intermediate coding passes are included between the first low-complexity coding passes and the final full-complexity coding pass. The first coding pass or coding passes are run with lower complexity (this often translates to disabling coding tools or modifying coding parameters such that said coding tools require less computational complexity, for example reducing the range or precision of the motion vector search) compared to the final coding pass.

The intermediate coding passes allow gathering of information so that inaccuracies in statistics estimated from the low-complexity passes can be corrected or updated and then the corrected/updated statistics can be passed on to the final coding pass. The information produced by the intermediate passes is stored and may be used by all subsequent coding passes (both further intermediate coding passes and the final coding pass). Such information can include picture or slice coding type (I or P or B, etc.), bit usage per category (texture, header, motion, etc.), coding mode statistics (e.g. how many skip or intra coding modes), block type statistics, spatial statistics such as variance, histograms, etc., coding parameters (QP and Lagrangian $\lambda$ used), coding tool settings (indicating which of them were enabled), motion vector information, motion-compensated (inter) and intra prediction errors, weighted prediction parameters, frame classifications (e.g. scene change), among others. All such information will be generally called "statistics" or "coding statistics" throughout the present disclosure.

Hence, after the intermediate pass or passes are complete, the gathered statistics are fed into a rate control analysis module. That same module is also fed the information from the first low complexity pass or passes. This information from the first low complexity passes and the intermediate coding passes can include motion and intra prediction and coding mode information that can be used by subsequent passes to speed up computations. This information is also useful for analysis purposes as it can provide a measure of complexity of the scene (e.g. classification into high motion or static, among others). Other types of information that can be passed to the rate control analysis module include bit usage statistics, coding parameters such as QPs and Lagrangian parameters, spatial and temporal statistics, intra and inter prediction error statistics, among others.

The rate control analysis module then uses this information to translate coding statistics obtained from the low complexity (or first type of complexity) passes into the statistics that would have been available if the first coding pass or passes were run with full computational complexity (or second type of complexity). The intermediate passes need not employ full complexity (or second type of complexity) during encoding. Instead, complexity can be of a different type (third type of complexity) that will be on average lower than the second type of complexity.

A lower type of complexity can be obtained by employing, for example, spatial and/or temporal sub-sampling in the intermediate passes. Temporal subsampling refers to coding a subset of the total frames in the image sequence. Such selection may be a) completely arbitrary, b) regular (by say discarding one frame out of two), or c) content specific where more frames are coded in more "interesting" or representative (active) parts of the image sequence and less frames are considered in less "interesting" or representative (static) parts of the image sequence. Spatial subsampling refers to considering a lower resolution version of the frame or the image sequence. Doing so may considerably speed up execution. The selection can also be content specific through selection of those frames whose absence would case the largest drop in rate-distortion performance.

Computational complexity of the intermediate passes may also be constrained by disabling certain coding tools, such as e.g. weighted prediction, subpixel motion estimation, deblocking, and trellis-optimized quantization, among others.

The coded frames may be sub-sampled in an evenly spaced manner, but may also be sampled based on some pre-analysis information. For example, if there are areas of the image sequence with frequent scene changes and areas that are static, i.e. motion information indicates very low motion and/or prediction residuals are sufficiently low and/or prediction modes such as skip are heavily used, the sampling factors need to adapted: only a few frames from the static areas need to be included in the intermediate pass, while more frames need to be considered from the more active areas of the image sequence.

If there are multiple intermediate passes, one may select different sub-sampled groups of frames (optionally using some phase difference/offset or some content-dependent sampling arrangement as discussed before) for each intermediate pass in order to retrieve additional information about the image sequence. In some embodiments, some or all of the multiple intermediate passes can be run in parallel.

Once a set of frames to be coded is selected, a prediction structure to code the selected frames is generated. As used throughout the present disclosure, a prediction structure defines the type and order of picture coding types that will be used to compress the image sequence. For example, five frames can be coded as an I frame (intra-frame coding) followed by four P frames (uni-predictive inter-frame coding), thus forming an IPPPP prediction structure which is the simplest coding structure and where display order coincides with coding order. To indicate display order the structure may be also written as I0P1P2P3P4. Another possible prediction structure would be IbBbP (where B refers to bi-predictive inter-frame coding) where small leiters denote disposable frames. To illustrate the display order, this coding/prediction structure is written as I0P4B2b1b3.

The statistics gathered during the intermediate pass or passes should be useful to the rate control analysis module so that such module can then estimate the statistics that would have resulted if one had used or the first coding passes the same complexity used to run the final pass.

This may be done by uncovering the relationships of the coding statistics for low or full complexity given the coding parameters, such as the coding type (for example I, P or B), and the quantization parameter, among others. These translation relationships may also be conditioned on the prediction structure: it is possible that the final coding pass has access to additional prediction structures that, say, for complexity reasons were not enabled during the first passes.

Therefore, one of the tasks of the intermediate passes is to uncover these relationships and use them to translate the statistics into the complexity type that is used in the final coding pass. When these relationships are available, the low complexity statistics may then be translated to their counterparts for full complexity operation. The translation of the statistics may also be further refined in subsequent intermediate passes, and also in the final coding pass where causal coding statistics are available to correct or update the translation relationships. For embodiments with multiple sub-sampled groups of frames, relationships and statistics translations in one pass may also be used in subsequent intermediate passes, or relationships and statistics from one group could also be used in a different, usually nearby group.

To that end the following high-level strategy can be adopted, as described for example with reference to FIG. 1. Some specific embodiments that follow these principles will be later described.

a. A first analysis stage examines the first coding passes and retrieves the types of frames that have been used to code the sequence (105). Such stage can also gather information on the prediction structures used, if desired. For example, some segments may have been coded with IPPPPP, some other ones with IbBbPbBbP and some others with IbPbPbP, among others. Capitals denote frames that will be used as motion-compensated references for subsequently coded frames. The structures are shown in display order, however, the display and coding order may not necessarily match.

b. A second stage creates prediction structure "atoms" (110): the smallest possible prediction units (groups of frames). In one possible embodiment, if the three possible structures of step (a) above were used to code the image sequence then this stage would produce a list with the following three prediction structure atoms: (i) IP, (ii) IbBbP, and (iii) IbP. However, the created prediction atoms need not be constrained to those used during the first coding passes. It is highly likely that one may wish to conduct the first coding passes using simple coding structures such as IPPP and then perform a final coding pass using a more complex coding structure such as, say, IbBbP. In encoders that support adaptive prediction structure generation, one may also want to use one of a set of possible prediction structures for the final coding pass. In either of these cases, all possible prediction structures available in the final coding pass are considered and added in the atom list for the intermediate passes, in addition to those used in the first coding passes. Doing so, can help in establishing translation relationships also across different prediction structures. An additional possible embodiment may include atoms that are specifically designed to establish relationships and evaluate the efficiency of multiple reference frames. One could for example use a structure such as IPPP and collect prediction error statistics for each reference frame of each P-coded frame.

The quantization parameters (QPs) used to code the frames are either pre-determined or are set through some pre-analysis mechanism such that the parameter estimation is made efficient. Moreover, the relationships of the QPs among different frame coding types within the atoms may be set in the manner they would be set as if the final coding pass was invoked.

In an alternative embodiment, the atoms may be extended in order to gather additional information about the image sequence statistics, that is not only useful for establishing the low/full complexity relationships, but also for establishing critical information such as the relationship of the QP with the number of generated bits. For example, in one possible embodiment, the prediction structure atoms are extended to enable estimation of QP relationships by repeating the shortest structure with different QP parameters: (i) (ii) IbBbPIbBbP, and (iii) IbPIbP. The frames in the latter half of the new atoms are allocated QPs that are offset by some pre-determined (through pre-analysis, etc.) value compared to those for the first half of the atoms. In a different possible embodiment, the prediction structure atoms are extended to enable estimation of prediction structure relationships by concatenating the possible atoms into some "super" atom: "IPIbPIbBbP" (for the above case). Note that in all above cases the display order of the frames being coded in each atom is reset with each intra-coded frame: e.g. for IPIP frames n, n+N, n, n+N will be coded.

(c) The image sequence is then examined to detect intra or, as in the case of H.264/MPEG-4 AVC, intra and/or instantaneous decoder refresh (IDR) frames. IDR frames in. H.264 provide a means of random access. Once a decoder receives an IDR file, the decoder flushes its own memory of previously decoded frames that are used as motion-compensated references. Hence one can start playback from any IDR frame and avoid drift due to the unavailability of reference frames. Therefore, an IDR intra frame ensures a true random access point. Other frame types that could be considered include fades, and possibly flashes.

Frames that have been coded as IDR are ideal to re-code by placing the "atoms" on their position as they stop temporal propagation and do not depend on coding decisions made prior to their coding. This can be important when temporal sub-sampling is used. All these positions are thus determined and collected into a list (115).

(d) The next stage of the algorithm deals with the generation of the prediction structure (117) used to code the intermediate pass. Given some constraint on the number of frames that may be used during the intermediate pass (say, 10% of the total number of frames), the algorithm loops through the intra/IDR frame positions found in the list generated in the previous stage (c). There are three possibilities: (i) the number of positions in the list times the number of the frames in the atoms exceeds the constraint on the intermediate pass frames. In such a case the positions are uniformly sub-sampled so that the constraint is satisfied. Alternatively, the positions are sub-sampled in a manner that fits the sequence statistics (more positions in active areas). (ii) The number of positions in the list times the number of the frames in the atoms does not exceed the constraint on the intermediate pass frames. In this case, new positions are retrieved by attempting to cover sequence areas that are underrepresented. This is done in a uniform manner or by adapting the position selections (sampling) to the image sequence statistics. (iii) No other action is required if uniform sampling is desired. If one desires to sample in a content dependent manner, then positions outside of the list may be selected to increase coverage of the more active areas.

(e) The intermediate coding pass is performed and statistics are gathered for every coded frame (120).

(f) The gathered statistics are analyzed jointly with their counterparts of the first low-complexity coding passes. Apart from translating statistics from low to high complexity, which may also be conditioned to the frame coding type and even the position of the frame in the prediction structure, this stage may also derive other relationships (125) that relate bit usage (texture or header) with the QP, among others, as described above in possible alternative embodiments.

(g) Finally, the relationships derived above are then fed to the final coding pass, which translates and updates coding statistics from the low complexity passes to high complexity coding.

A flow-chart of the above algorithm is shown in FIG. 1. A high-level diagram of the method is also shown in FIG. 2.

Figure 2:
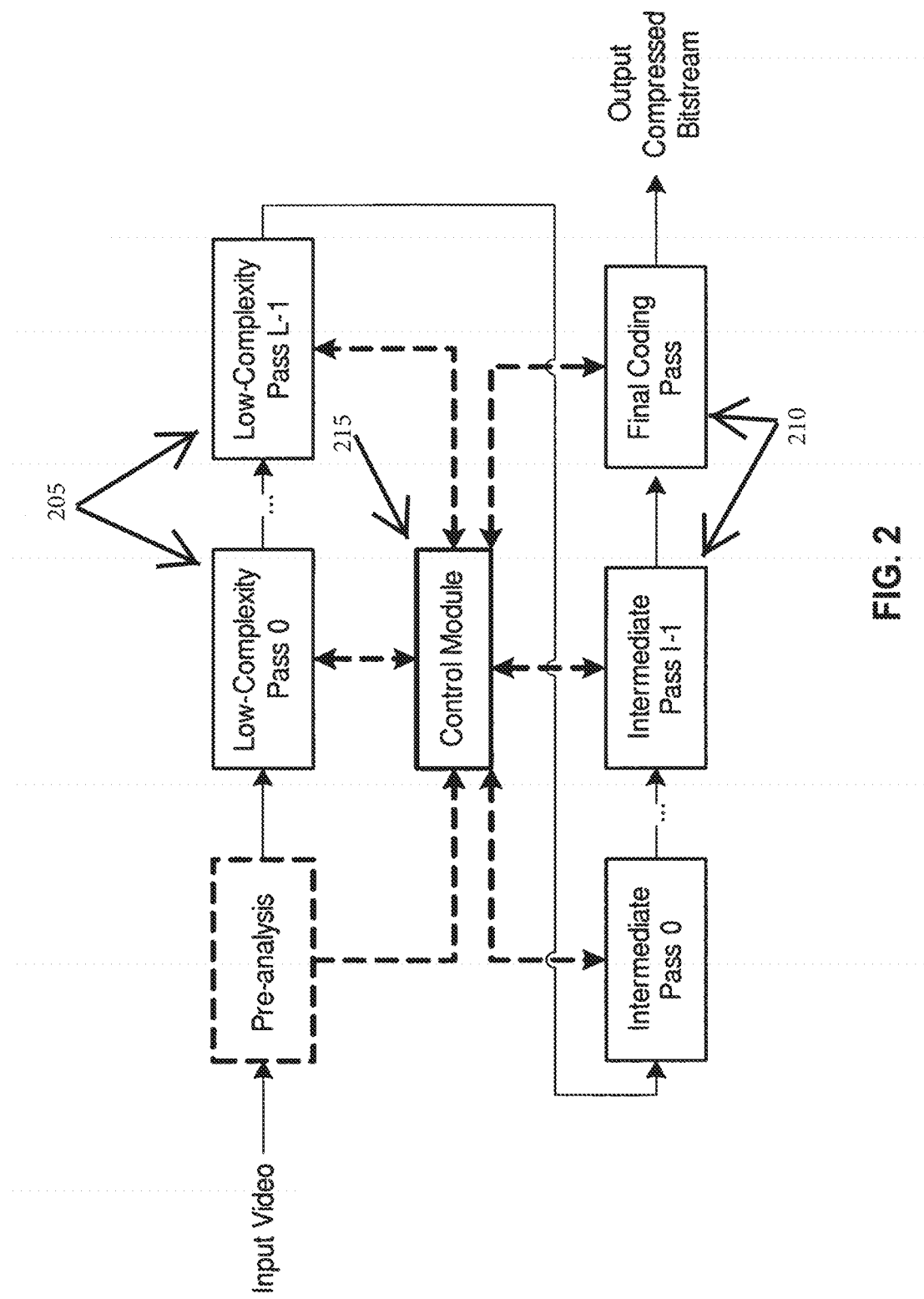
FIG. 2 shows a schematic diagram of the method for low-complexity multiple-pass rate control in accordance with the present disclosure.

As seen in FIG. 2, there can be an arbitrary number of first low-complexity coding passes, (205) as well as an arbitrary number of intermediate coding passes (210). The control module (215) makes the decisions about the configuration (e.g. prediction structure, QPs, miscellaneous coding parameters and tools, etc.) and number of additional low-complexity coding passes and the intermediate passes. It is also responsible for processing the coding statistics from each coding pass and feeding them to the rate control component of the last high-complexity coding pass. Last, the pre-analysis module is optional and if present may assist the control module with the preparation of the low-complexity and intermediate coding passes, as discussed before. Note that in an additional embodiment, the low complexity passes may be parallelized if they are designed in such a way so that they process different or overlapping areas of the image sequence. The same is also true for the intermediate passes, where if more than one are run, different sets (possibly overlapping) of frames may be considered in each intermediate pass.

Steps (a)-(d), (f) and (g) are executed in the rate control module of FIG. 2. This module sets up the first low complexity passes that are then executed in encoders, analyzes the statistics produced by such passes, optionally exploits pre-analysis information and then sets up the intermediate coding passes that are executed in separate encoders. Statistics are analyzed after each coding pass and can be used to augment subsequent passes (of any type). Finally, the rate control module sets up the final coding pass and passes along the configuration to an encoder module.

In an additional embodiment, the initial coding passes can also be replaced by some pre-processor analysis passes that do not produce any compressed bitstreams but instead produce statistics that can be useful to a rate control algorithm. The rate control analysis module could still translate those statistics into coding statistics with the help of appropriate intermediate coding passes.

In an additional embodiment, an additional intermediate coding pass may be used to improve the quality of the statistics gathered in the first low complexity coding pass. In this embodiment, the first coding pass uses fixed QP allocation and avoids using rate control to achieve some bit rate target. Such a strategy is beneficial in estimating prediction errors that will be normalized to the same QP value and will thus be comparable among all frames in the image sequence. This is beneficial for both rate control and bit allocation in subsequent coding passes. However, if the pre-determined QP results to a bit rate that is far off the original bit rate target this may negatively impact the reliability of the statistics gathered during the first coding pass. In this case, one may perform a second low complexity coding pass that compensates for the bit rate (and QP) discrepancy of the first low complexity coding pass. After the first pass has been performed the control module determines whether the resulting bit rate is close enough to the original bit rate target. If that is not the case, then the control module performs an additional low complexity coding pass with a new pre-determined QP value such that the resulting bit rate will be close enough to the original bit rate target. The statistics gathered during this additional coding pass can then replace, update, or complement statistics gathered during previous low-complexity coding passes. Note that information that may be used to speed up the coding process such as motion and coding mode information may be shared across the coding passes.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] Advanced video coding for generic audiovisual services, http://www.itu.int/rec/recommendation.asp?type=folders&lang=e&parent=T-REC-H.264, October 2009.
[2] L. Merritt and R. Vanam, "X264: A High-Performance H.264/AVC Encoder", http://akuvian.org/src/x264/overview_x264_v8_5.pdf.

The invention claimed is:

1. A method for coding video information in multiple coding passes to control rate of the video information, comprising:
    optimizing one or more low computational complexity coding passes for one or more of: coding efficiency, transmission efficiency, and scalability of the one or more low computational complexity coding passes;
    applying the optimized one or more low computational complexity coding passes to the video information;
    collecting initial statistics on the coded video information based on the one or more low computational complexity coding passes;
    optimizing intermediate coding passes for bit usage of the intermediate coding passes, the intermediate coding passes comprising prediction structures;
    applying the optimized intermediate coding passes to the coded video information;
    analyzing bit usage of the applied optimized intermediate coding passes, and coding performance of the prediction structures, the prediction structures comprising a sequence of parameters, the parameters describing a type and coding order for each frame in the prediction structures, the type comprising at least one of: an intra-frame, a uni-predictive inter-frame, a bi-predictive inter-frame, and a disposable frame;
    collecting updated statistics on the coded video information based on the analyzed bit usage and analyzed coding performance;
    detecting coding inaccuracies in the coded video information resulting from the optimized one or more low computational complexity coding passes;
    setting a full complexity coding pass at a computational complexity higher than the optimized intermediate coding passes;
    optimizing the full complexity coding pass to remove the detected coding inaccuracies and for one or more of: coding efficiency, transmission efficiency, and scalability of the full complexity coding pass, based on the initial statistics and the updated statistics; and
    applying the optimized full complexity coding pass to the coded video information.

2. The method as recited in claim 1, further comprising generating the prediction structures based on the video information and minimizing a length of the prediction structures.

3. The method as recited in claim 2, wherein generating the prediction structures comprises:
    generating prediction structure atoms;
    determining positions, inside the video information, where the prediction structure atoms should be inserted to optimize coding performance of the prediction structures;
    optimizing coding performance of the prediction structure atoms; and
    generating new prediction structures using different prediction structure atoms;
    wherein each prediction structure atom comprises a smallest possible prediction unit.

4. The method as recited in claim 3, wherein generating the prediction structures further comprises:
    generating, in addition to the initial prediction structure atoms, additional prediction structure atoms drawn from prediction structures to be used for the further coding pass of the video information.

5. The method as recited in claim 3, wherein the prediction structure atoms are extended to larger prediction structures.

6. The method as recited in claim 1, wherein the one or more low computational complexity coding passes are asymmetric in terms of coding complexity and/or coded frames.

7. The method as recited in claim 1, wherein the one or more low computational complexity coding passes have a computational complexity lower than the intermediate coding passes.

8. The method as recited in claim 1, wherein each coding pass comprises coding a plurality of frames from the video information.

9. The method as recited in claim 1, wherein the intermediate coding passes comprises temporal and spatial subsampling.

10. The method as recited in claim 9, wherein the intermediate coding passes subsample frames in an even spaced manner or based on pre-analysis information.

11. The method as recited in claim 1, wherein the intermediate coding passes are content-based through selection of the most representative frames of the video information.

12. The method as recited in claim 1, wherein the intermediate coding passes are content-based through selection of those frames whose absence would cause the largest drop in rate-distortion performance.

13. The method as recited in claim 1, wherein the intermediate coding passes comprises a plurality of coding passes, wherein each coding pass codes different groups of frames of the video information.

14. The method as recited in claim 13, wherein the video information comprises multiple sub-sampled groups of frames and wherein:
    statistics derived from one pass are adapted to be used in subsequent intermediate coding passes.

15. The method as recited in claim 13, wherein the video information contains multiple sub-sampled groups of frames and wherein:

statistics from one group are adapted to be used in a different group.

16. The method as recited in claim 15, wherein the different group comprises a nearby group.

17. The method as recited in claim 13, wherein each coding pass comprises:
   selection of a frame subset of the video information; and
   selection of a prediction structure for the video information.

18. The method as recited in claim 1, wherein statistics derived from one pass are adapted to be used in subsequent intermediate coding passes.

19. The method as recited in claim 1, further comprising, prior to the intermediate coding passes:
   examining the video information to detect one or more of:
      intra frames;
      instantaneous decoder refresh (IDR) frames;
      scene changes; or
      fade transitions.

20. The method as recited in claim 19, wherein the positions of one or more of the detected intra frames, IDR frames, scene changes or fade transitions are used to build prediction structures using prediction structure atoms.

21. The method as recited in claim 1, further comprising: storing the initial statistics and the updated statistics.

22. The method as recited in claim 1, wherein the applying the optimized full complexity coding pass occurred over a duration of time, the applying the optimized full complexity coding pass comprising:
   generating causal coding statistics throughout the duration of time of the applying the optimized full complexity coding pass; and
   applying the optimized full complexity coding pass based on the causal coding statistics.

23. A video information coding system comprising:
   one or more low computational complexity coders configured to collect initial statistics on the coded video information by performing low computational complexity coding passes;
   one or more intermediate coders, each intermediate coder configured to perform intermediate coding passes of the video information;
   a rate control analysis module configured to:
      optimize the intermediate coding passes for bit usage of the intermediate coding passes, the intermediate coding passes comprising prediction structures;
      analyze bit usage of applied optimized intermediate coding passes, and coding performance of the prediction structures, the prediction structures comprising a sequence of parameters, the parameters describing a type and coding order for each frame in the prediction structures, the type comprising at least one of: an intra-frame, a uni-predictive inter-frame, a bi-predictive inter-frame, and a disposable frame;
      collect updated statistics on coded video information based on the analyzed bit usage and analyzed coding performance;
      detect coding inaccuracies in the coded video information resulting from the optimized one or more low computational complexity coding passes;
      set a full complexity coding pass at a computational complexity higher than the optimized intermediate coding passes; and
      optimize the full complexity coding pass to remove the detected coding inaccuracies and for one or more of: coding efficiency, transmission efficiency, and scalability of the full complexity coding pass, based on the initial statistics and the updated statistics; and
   a further coder configured to perform the full complexity coding pass of the video information.

24. The system as recited in claim 23, wherein statistics received from the rate control analysis module comprise one or more of:
   motion prediction;
   intra prediction;
   coding mode information;
   bit usage statistics;
   coding parameters;
   spatial statistics;
   temporal statistics;
   intra prediction error statistics; or
   inter prediction error statistics.

25. The system as recited in claim 23, further comprising:
   a pre-analysis module configured to provide initial statistics of the video information in addition to the initial statistics provided by the one or more low computational complexity coders, wherein the rate control analysis module is configured to analyze the initial statistics provided by the pre-analysis module, the initial statistics provided by the one or more low computational complexity coders, and the updated statistics jointly.

26. A non-transitory computer-readable storage media that comprises a set of instructions stored therewith which, when executed by one or more computing or processing devices, causes performance of a process, the process comprising the steps of:
   optimizing one or more low computational complexity coding passes for one or more of: coding efficiency, transmission efficiency, and scalability of the one or more low computational complexity coding passes;
   applying the optimized one or more low computational complexity coding passes to the video information;
   collecting initial statistics on the coded video information based on the one or more low computational complexity coding passes;
   optimizing intermediate coding passes for bit usage of the intermediate coding passes, the intermediate coding passes comprising prediction structures;
   applying the optimized intermediate coding passes to the coded video information;
   analyzing bit usage of the applied optimized intermediate coding passes, and coding performance of the prediction structures, the prediction structures comprising a sequence of parameters, the parameters describing a type and coding order for each frame in the prediction structures, the type comprising at least one of: an intra-frame, a uni-predictive inter-frame, a bi-predictive inter-frame, and a disposable frame;
   collecting updated statistics on the coded video information based on the analyzed bit usage and analyzed coding performance;
   detecting coding inaccuracies in the coded video information resulting from the optimized one or more low computational complexity coding passes;
   setting a full complexity coding pass at a computational complexity higher than the optimized intermediate coding passes;
   optimizing the full complexity coding pass to remove the detected coding inaccuracies and for one or more of: coding efficiency, transmission efficiency, and scalability of the full complexity coding pass, based on the initial statistics and the updated statistics; and applying the optimized full complexity coding pass to the coded video information.

27. A system, comprising:

means for optimizing one or more low computational complexity coding passes for one or more of: coding efficiency, transmission efficiency, and scalability of the one or more low computational complexity coding passes;

means for applying the optimized one or more low computational complexity coding passes to the video information;

means for collecting initial statistics on the coded video information based on the one or more low computational complexity coding passes;

means for optimizing intermediate coding passes for bit usage of the intermediate coding passes, the intermediate coding passes comprising prediction structures;

means for applying the optimized intermediate coding passes to the coded video information;

means for analyzing bit usage of the applied optimized intermediate coding passes, and coding performance of the prediction structures, the prediction structures comprising a sequence of parameters, the parameters describing a type and coding order for each frame in the prediction structures, the type comprising at least one of: an intra-frame, a uni-predictive inter-frame, a bi-predictive inter-frame, and a disposable frame;

means for collecting updated statistics on the coded video information based on the analyzed bit usage and analyzed coding performance;

means for detecting coding inaccuracies in the coded video information resulting from the optimized one or more low computational complexity coding passes;

means for setting a full complexity coding pass at a computational complexity higher than the optimized intermediate coding passes;

means for optimizing the full complexity coding pass to remove the detected coding inaccuracies and for one or more of: coding efficiency, transmission efficiency, and scalability of the full complexity coding pass, based on the initial statistics and the updated statistics; and means for applying the optimized full complexity coding pass to the coded video information.

28. The method of claim 1, wherein optimizing the intermediate coding passes comprises minimizing the prediction structures.

* * * * *